(12) United States Patent
Prenger et al.

(10) Patent No.: US 12,073,659 B2
(45) Date of Patent: Aug. 27, 2024

(54) VEHICLE INFORMATION SERVICE FOR ON-VEHICLE APPLICATIONS

(71) Applicant: VIASAT INC., Carlsbad, CA (US)

(72) Inventors: Roger Prenger, Gilbert, AZ (US); Gregory Jay, San Diego, CA (US)

(73) Assignee: Viasat, Inc., Carlsbad, CA (US)

( * ) Notice: Subject to any disclaimer, the term of this patent is extended or adjusted under 35 U.S.C. 154(b) by 808 days.

(21) Appl. No.: 17/264,191

(22) PCT Filed: Oct. 17, 2018

(86) PCT No.: PCT/US2018/056360
§ 371 (c)(1),
(2) Date: Jan. 28, 2021

(87) PCT Pub. No.: WO2020/027858
PCT Pub. Date: Feb. 6, 2020

(65) Prior Publication Data
US 2021/0272389 A1  Sep. 2, 2021

Related U.S. Application Data

(60) Provisional application No. 62/713,122, filed on Aug. 1, 2018.

(51) Int. Cl.
*H04L 29/06* (2006.01)
*G07C 5/00* (2006.01)
(Continued)

(52) U.S. Cl.
CPC .............. *G07C 5/008* (2013.01); *H04L 12/40* (2013.01); *H04W 12/04* (2013.01); *H04W 12/06* (2013.01); *H04L 2012/40273* (2013.01)

(58) Field of Classification Search
CPC .................... G07C 5/008; H04L 12/40; H04L 2012/40273; H04W 12/06; H04W 12/04
See application file for complete search history.

(56) References Cited

U.S. PATENT DOCUMENTS

2017/0295154 A1  10/2017  Jackson et al.
2017/0374548 A1* 12/2017  Mason .................. H04L 63/062
(Continued)

FOREIGN PATENT DOCUMENTS

EP  1961195 A1  8/2008

OTHER PUBLICATIONS

Gavigan et al., Vehicle Information Service Specification, Feb. 13, 2018, retrieved from internet, URL: https://www.w3.org/TR/vehicle-information-service/, 60 pages.
(Continued)

*Primary Examiner* — Jared Fureman
*Assistant Examiner* — Esayas G Yeshaw
(74) *Attorney, Agent, or Firm* — Holland & Hart LLP

(57) ABSTRACT

A vehicle information service for monitoring vehicle data from a vehicle data bus and providing a secure interface to allow devices on the vehicle to retrieve vehicle data for which they have authorization is described. The vehicle information service may organize the vehicle data into one more collections of vehicle data, where different collections may be authorized for different application authentication profiles and include different combinations of the vehicle data. The vehicle information service may also offer and restrict access to information about other devices or services on the vehicle. The vehicle information service may also provide control of various devices such as devices coupled with an access network on the vehicle or devices coupled with the vehicle data bus.

30 Claims, 9 Drawing Sheets

(51) Int. Cl.
*H04L 12/40* (2006.01)
*H04W 12/04* (2021.01)
*H04W 12/06* (2021.01)

(56) References Cited

U.S. PATENT DOCUMENTS

2019/0306754 A1* 10/2019 Shan .................. H04W 8/06
2019/0313359 A1* 10/2019 Lee ................... H04W 4/40
2020/0112907 A1* 4/2020 Dao .................. H04M 15/8016
2021/0268881 A1* 9/2021 Kobel .................. G09F 9/335

OTHER PUBLICATIONS

ISA/EPO, International Search Report and Written Opinion, International App. No. PCT/US2018/056360, Mar. 3, 2019, European Patent Office, 12 pgs.

* cited by examiner

|  | Collection 1 | Collection 2 | Collection 3 | Collection 4 |
|---|---|---|---|---|
| Customer Application Profile | X |  |  |  |
| Cabin Crew Application Profile | X | X | X |  |
| Pilot Application Profile | X | X | X | X |
| ⋮ | ⋮ | ⋮ | ⋮ | ⋮ |

805 (rows), 810 (columns)

FIG. 8

VEHICLE INFORMATION SERVICE FOR ON-VEHICLE APPLICATIONS

CROSS REFERENCES

The present Application for Patent is a 371 National Phase filing of International Patent Application No. PCT/US2018/056360 by Prenger et al. entitled "Vehicle information Service For On-Vehicle Applications" filed Oct. 17, 2018, which claims the benefit of U.S. Provisional Application No. 62/713,122, entitled "Vehicle Information Services for On-Vehicle Applications, filed 1 Aug. 2018, each of which are assigned to the assignee hereof, and each of which is hereby incorporated by reference in its entirety.

BACKGROUND

As the use of communications and networking continues to grow around the world, users are demanding an "always on" networking experience where content and information is available even in remote areas or mobile communications environments. Some mass transportation vehicles, such as aircraft, ships, and trains, provide on-board network services to passengers to access various on-board content, or network access service to the Internet. In addition, some vehicles have a separate vehicle data bus (e.g., controller area network (CAN) bus) where vehicle-related information is communicated between various vehicle components. The on-board network services are typically separate from the vehicle data bus because the security of the vehicle data bus could be compromised by allowing access by components or devices other than those that are integrated with the vehicle. Thus, vehicle information is generally unavailable to devices that are not directly connected to the vehicle data bus.

SUMMARY

Methods, systems, and devices are described for providing vehicle information services for on-vehicle applications. Within a mobile communications environment such as a mass transportation vehicle, a vehicle access network may include a vehicle information service controller, one or more access points (APs), and one or more communications devices (e.g., smartphones, laptops, tablets, netbooks, and the like). The vehicle access network may also communicate with one or more external networks via an external communication link. The vehicle may also have a vehicle data bus that may be used for communication and/or control by multiple sensors or other components distributed within the mobile communications environment. The sensors may include, for example, a global navigation satellite system (GNSS) receiver, inertial measurement sensors, gyroscopes, temperature sensors, altimeters, speedometers, occupancy sensors, door sensors, and various other measurement devices as described herein.

In some cases, the vehicle information service controller may be connected to the vehicle data bus and monitor vehicle information flowing on the bus. The vehicle information service controller may provide certain portions of the vehicle information to the communications devices on the vehicle to enable certain applications on the communications devices to make use of the vehicle information. In some cases, the vehicle information service controller may organize the vehicle data into one more collections of vehicle data, where different collections may be authorized for different application authentication profiles and include different combinations of the vehicle data. A network access system may also allow the communications devices to communicate with the external networks via the external communication link.

A particular application may use a first collection of the one or more collections of the vehicle data to provide the application's functions to the communications device. The communications devices may transmit to the vehicle information service controller a query from the application for the first collection of the vehicle data. The query may be transmitted with a cryptographic key (i.e., a security key) to authenticate the query. According to various aspects, the communications device may also send queries to the vehicle information service controller for status information of other devices on board the vehicle, for example other communications devices or APs, or to control these other devices.

The controller may authenticate the query for the first collection of vehicle data. The authentication may be based on an application authentication profile associated with the cryptographic key, as may have been received with the query. If the controller successfully authenticates the query for the first collection of vehicle data, the controller may transmit to the application of the communications device the first collection of vehicle data.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 8 shows an example application authorization table that supports providing a vehicle information service for on-vehicle applications in accordance with aspects of the disclosure.

DETAILED DESCRIPTION

Figure 1:
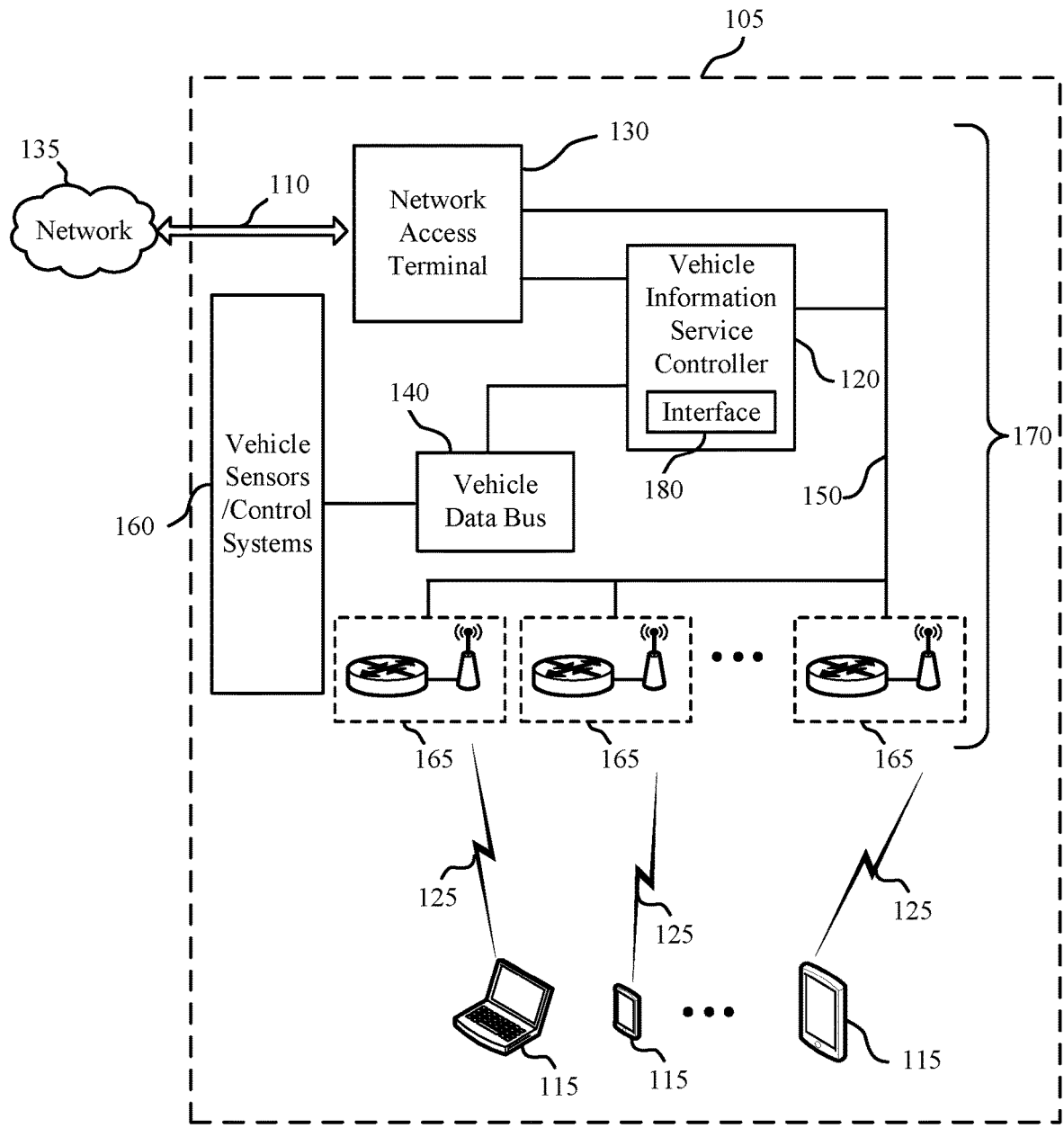
FIG. 1 shows an example communications environment that supports providing a vehicle information service for on-vehicle applications in accordance with aspects of the disclosure.

The described features generally relate to a vehicle information service for on-vehicle applications. In a mobile communications environment such as on a mass transportation vehicle, a vehicle access network may include one or more access points (APs), and one or more communications devices (e.g., smartphones, laptops, tablets, netbooks, and the like). The vehicle access network may also provide a communication link with one or more external networks (e.g., other networks such as Intranets or the Internet).

A vehicle data bus may be used to connect multiple sensors, communication, or control systems distributed about the mobile communications environment and transfer a variety of vehicle information. The sensors may include, for example, a global navigation satellite system (GNSS) receiver, inertial measurement sensors, gyroscopes, temperature sensors, altimeters, speedometers, and various other measurement devices as described herein. The vehicle data bus may carry a variety of sensitive vehicle information such as crew communications, vehicle operational parameters, and the like. In addition, the control systems which use the vehicle data bus may be safety-critical systems such as door lock control, landing gear control, cabin lighting, and the like. Thus, maintaining the security of the vehicle data bus is critical to vehicle safety. Accordingly, the vehicle data bus is generally separate and independent from any on-board networks accessible by devices that are not integrated into the vehicle.

Increasingly, users are expecting to have "always-on" connectivity including access to content and up-to-date information. However, providing access to vehicle information such as information carried via the vehicle data bus provides a substantial security risk to the safety of the vehicle and passengers. Thus, although users increasingly expect an immersive experience while travelling, they often do not have access to up-to-date information such as location, altitude, vehicle speed, time of arrival, and the like.

According to various aspects, a vehicle information service controller may be connected to the vehicle data bus for monitoring vehicle data, and may provide a secure interface to allow devices on the vehicle access network to retrieve vehicle data for which they have authorization. The vehicle information service controller may organize the vehicle data into one more collections of vehicle data, where different collections may be authorized for different application authentication profiles and include different combinations of the vehicle data.

Various applications may use collections of the vehicle data to provide enhanced functionality and integration to vehicle communications. For example, a pilot of an aircraft may use an electronic flight bag (EFB) to perform flight management tasks. An EFB may generally be in the form of a laptop computer or tablet, and may be used to access the aircraft manual, navigational charts, or performance calculations such as take-off calculations. The EFB may also connect to the vehicle access network for aircraft-related content such as on-line materials, or general Internet access. However, some EFBs do not have direct access to current vehicle data. Although it is possible to connect the EFB to the vehicle data bus directly, this increases the hardware requirements for the EFB, and raises a security issue if the EFB is also connected to the vehicle access network. Specifically, if the EFB bridges the "air gap" between the vehicle data bus and the vehicle access network, it may be subject to attempts to access the vehicle data bus through the EFB. EFBs also may be commercially off-the-shelf devices such as tablets that have few modifications. Such devices may pose a higher security risk because they may not have high security protections while having access to a large amount of potentially sensitive vehicle information.

In contrast, the vehicle information service controller may pose a lower security risk because it may be implemented as a secure server, and may only implement limited functionality of the vehicle data bus. For example, the vehicle information service controller may include limited control functionality (e.g., limited to certain non-safety critical systems), and may have increased security such as a firewall and other security measures. The vehicle information service controller may therefore provide more secure access to collections of vehicle data, and may be a more secure way for the EFB to access vehicle data, especially in situations where it is connected to the vehicle access network.

An application running on the EFB for use by the pilot may provide a larger collection of vehicle information than, for example, an application running on a communications device to be used by the cabin crew aboard the aircraft. Similarly, an application running on a device to be used by cabin crew may have access to a larger collection of vehicle information than an application to be used on a passenger's personal communications device or on an in-flight entertainment (IFE) system to be used by a passenger. These differences in the amount of vehicle information available to the applications may be controlled through authorization privileges and profile-based access to the vehicle information for which the profile is authorized. In this way, the vehicle information service controller may capture and store a subset or all of the vehicle information obtained from the vehicle data bus, and provide limited portions of the vehicle information to end-user applications without providing the users access to the vehicle data bus. By providing collections of vehicle information for particular applications based on a per-profile authorization for the particular collection, the vehicle access network may limit exposure of potentially sensitive vehicle information to applications that do not use that vehicle information.

Additionally, in some cases, the vehicle information service controller may similarly offer and restrict access to information about other devices on the vehicle, other services on the vehicle, etc., in a similar manner based on an application authentication profile associated with a requesting application. For example, an application may request certain information to be used to perform the application's intended purpose, such as user statistics for other applications, a status of devices in the system, other services operating on the vehicle, etc. In these cases, the vehicle information service controller may allow or restrict access to the requested information, for example, based on an application authentication profile associated with the application in a similar manner as for flight information.

In some cases, an application may share its own status to the vehicle information service controller. This may allow for the application to integrate with monitoring of the overall mobile environment. The same or a different application may request to use the status information of applications on other communications devices aboard the mobile communications environment. In some cases, the vehicle information service controller may similarly restrict access to at least a portion of the status information for particular applications, for example, based on an application authentication profile associated with the application. However, because more applications sharing respective status information may provide relatively improved monitoring of the overall system, the vehicle information service controller may allow access to any participating application to encourage participation in the overall system.

In another example, an application may request information including an identification of another communications device within the mobile communications environment. This may allow the application to correlate an address (e.g., a local area network (LAN) internet protocol (IP) address) with a device accessing service, for example, that may be provided by the vehicle access network. For example, a content management application may use this to manage content for a user that has subscribed to a specific service using a different communications device.

In another example, an application may be allowed to control certain components of a network access system. For example, an application may be authorized to control or reset an AP within the mobile communications environment. This may allow the application to control the state of the AP and correspondingly the vehicle access network (e.g., wireless LAN (WLAN) network) in the mobile communications environment without needing access to, for example, a physical panel within the cabin. For example, an application associated with a cabin crew application authentication profile may reset APs that may not be properly functioning.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 shows an example communications environment 100 that supports providing vehicle information services for on-vehicle applications in accordance with aspects of the disclosure. The communications environment 100 includes multiple communications devices 115 (e.g., smartphones, laptops, tablets, netbooks, and the like) that may be connected with one more access points (APs) 165 of a vehicle access network 150 using respective communication links 125. The APs 165 may be wired APs or wireless AP (WAPs), and may be distributed about the mobile communications environment 105. The APs 165 may provide traffic switching or routing functionality (e.g., as part of a WLAN, basic service set (BSS), or extended service set (ESS), etc.). The communications devices 115 may be user devices or cabin devices distributed about a mobile communications environment 105. In some cases, the mobile communications environment 105 may be a mobile vehicle. A network access terminal 130 may provide network access for communication devices 115 to one or more external networks 135 via communication link 110. Communications over the communication link 110 may be performed by a modem, which may be integrated with the network access terminal 130, or a separate component, in some cases. The network access terminal 130 may also include sensors, processors, servers, transceivers, or other relevant electronics to perform the functions described herein, as well as an antenna, which may be located in a location on the mobile vehicle suitable for maintaining communications with a satellite or ground station (e.g., on the fuselage of an aircraft).

Within the mobile communications environment 105, a vehicle data bus 140 may be used for communication or control of vehicle systems. The vehicle data bus 140 may be, for example, an avionics data bus such as an ARINC (Aeronautical Radio, INC.) bus, a controller area network (CAN) bus, and the like. The vehicle data bus 140 may be in communication with multiple vehicle sensors/control systems 160 distributed about the mobile communications environment 105. These vehicle sensors/control systems 160 may provide information to monitor the vehicle, for example, during the flight of an aircraft. This information may then assist, for example, a pilot to control and operate the vehicle. The vehicle sensors/control systems 160 may include, for example, GNSS receivers, inertial measurement sensors, gyroscopes, temperature sensors, altimeters, speedometers, occupancy sensors, door sensors, lighting control, and various other measurement devices or control systems as described herein (e.g., measurement devices corresponding to each of the parameters as discussed with reference to FIGS. 2 through 5).

According to various aspects, the vehicle information service controller 120 may monitor the vehicle data bus 140 and provide certain portions of the vehicle information to other devices on the vehicle, for example, the communications devices 115, to enable certain applications to make use of the vehicle information. The vehicle information service controller 120 may organize the vehicle data into one more collections of vehicle data, where different collections may be authorized for different application authentication profiles and include different combinations of the vehicle data. The vehicle information service controller 120 may provide an interface 180 (e.g., a vehicle information service interface) for the communications devices 115 to access the vehicle information services. The interface 180 may be, for example, a Uniform Resource Identifiers ((URIs) or Uniform Resource Locator (URL) functioning as an endpoint for queries via a protocol such as HyperText Transfer Protocol (HTTP). The URIs or URLs may indicate an interface hostname (i.e., a domain name), port number, interface version, and specific resource that is an endpoint for queries. The interface may use a data interchange format (e.g., JavaScript Open Notation (JSON) data) to identify the vehicle data sought.

The vehicle information service controller 120 may connect to the different devices and components of the communications environment 100 via the vehicle access network 150. For example, the vehicle information service controller 120 may be accessible as a server on the vehicle access network 150. In some examples, the vehicle information service controller 120 may be integrated with other components of the mobile environment 105 such as the network access terminal 130, or be integrated with one of the APs 165. The vehicle data bus 140 may be independent of the vehicle access network 150 (e.g., not addressable or directly accessible from the vehicle access network 150). That is, the communications devices 115 may not have direct access to the vehicle data bus 140.

The vehicle information service controller 120 may provide a vehicle information service to the communications devices 115 within the mobile communications environment 105 that may allow the communications devices 115 to access one or more collections of vehicle data. For example, applications on the communications devices 115 may access the vehicle information service. The applications may use the vehicle information services to enhance the functionality or user experience provided by the application by, for example, integrating some vehicle data (e.g., vehicle location, speed, time of arrival) with other application functions.

The applications may include, for example, applications running on a user's mobile communications device 115 (e.g., a user's personal smartphone, laptop, tablet, netbook, and the like), an on-board communications device 115 (e.g., a seat-back IFE system), or a cabin device (e.g., EFB, cabin service device). In either case, the vehicle information service may permit an application to query for and use vehicle information for the application but without the application having direct access to the vehicle data bus 140.

In some cases, different applications may use different collections of the vehicle information to provide the application's respective functions. For example, a pilot of an aircraft may use an EFB to perform flight management tasks. An application running on the EFB for use by the pilot may provide a larger collection of vehicle information than, for example, an application running on a communications device 115 to be used by the cabin crew aboard the aircraft. Similarly, an application running on a device 115 to be used by cabin crew may have access to a larger collection of vehicle information than an application to be used on a passenger's personal communications device 115 or on an IFE system to be used by a passenger. These differences in the amount of vehicle information available to the applications may be controlled through authorization privileges and profile-based access to the vehicle information for which the profile is authorized. In this way, the vehicle information service controller 120 may provide limited and access-controlled portions of the vehicle information to end-user applications without providing the users access to the vehicle data bus 140. By providing collections of vehicle information for particular applications based on a per-profile authorization for the particular collection, the vehicle information service controller 120 may limit exposure of potentially sensitive vehicle information to applications that do not use that vehicle information.

Additionally, in some cases, the vehicle information service controller 120 may similarly provide and restrict access to information about other devices on the vehicle, other services on the vehicle, etc., in a similar manner based on an application authentication profile associated with a requesting application. For example, an application may request certain information to be used to perform the application's intended purpose, such as user statistics for other applications, a status of devices in the system, other services operating on the vehicle, etc. In these cases, the vehicle information service controller 120 may allow or restrict access to the requested information, for example, based on an application authentication profile associated with the application in a similar manner as for vehicle information.

In some cases, an application may share its own status to the vehicle information service controller 120. This may allow for the application to integrate with monitoring of the overall system. The application or another application may request to use the status information of applications on other communications devices 115 aboard the mobile communications environment 105. In some cases, the vehicle information service controller 120 may similarly allow or restrict access to at least a portion of the status information for particular applications, for example, based on an application authentication profile associated with the application. However, because more applications sharing respective status information may provide relatively improved monitoring of the overall system or an enhanced user experience, the vehicle information service controller may allow access to any participating application to encourage participation in the overall system.

In another example, an application may request information including an identification of another communications device 115 within the mobile communications environment 105. This may allow for the application to correlate an address (e.g., a LAN IP address) with a device accessing service, for example, that may be provided by the vehicle access network 150. For example, a content portal may use this to manage content for a user that has subscribed to a specific service using a different communications device 115.

Additionally, in some cases the communications environment 100 provides a network access system 170 to connect the communications devices 115 to one or more external networks 135 via the communication link 110. The network access system 170 may include the network access terminal 130 and one or more APs 165. The network access system 170 may also include an antenna, which may be located in a location on the mobile vehicle suitable for maintaining communications with a satellite or ground station of the external networks 135 (e.g., on the fuselage of an aircraft). The communication link 110 may be a wireless communication link between the network access terminal 130 located in the mobile communications environment 105 and one or more external networks 135, which may include any suitable public or private networks and may be connected to other communications networks such as the Intranets, the Internet, telephony networks (e.g., Public Switched Telephone Network (PSTN), etc.), and the like.

In another example, an application may be allowed to control certain components of the network access system 170 via the interface 180 of the vehicle information service controller 120. For example, an application may be authorized to control or reset an AP 165 within the mobile communications environment 105. This may allow the application to control the state of the AP 165 and correspondingly the WLAN network (e.g., Wi-Fi) in the mobile communications environment without needing access to, for example, a physical panel within the cabin. For example, an application associated with a cabin crew application authentication profile may reset APs 165 that may not be properly functioning.

Techniques and procedures for providing collections of vehicle information on an authentication profile basis for particular applications and for providing the above-described functionalities are described below in the following example process flows described with reference to FIGS. 2 through 5.

Figure 2:
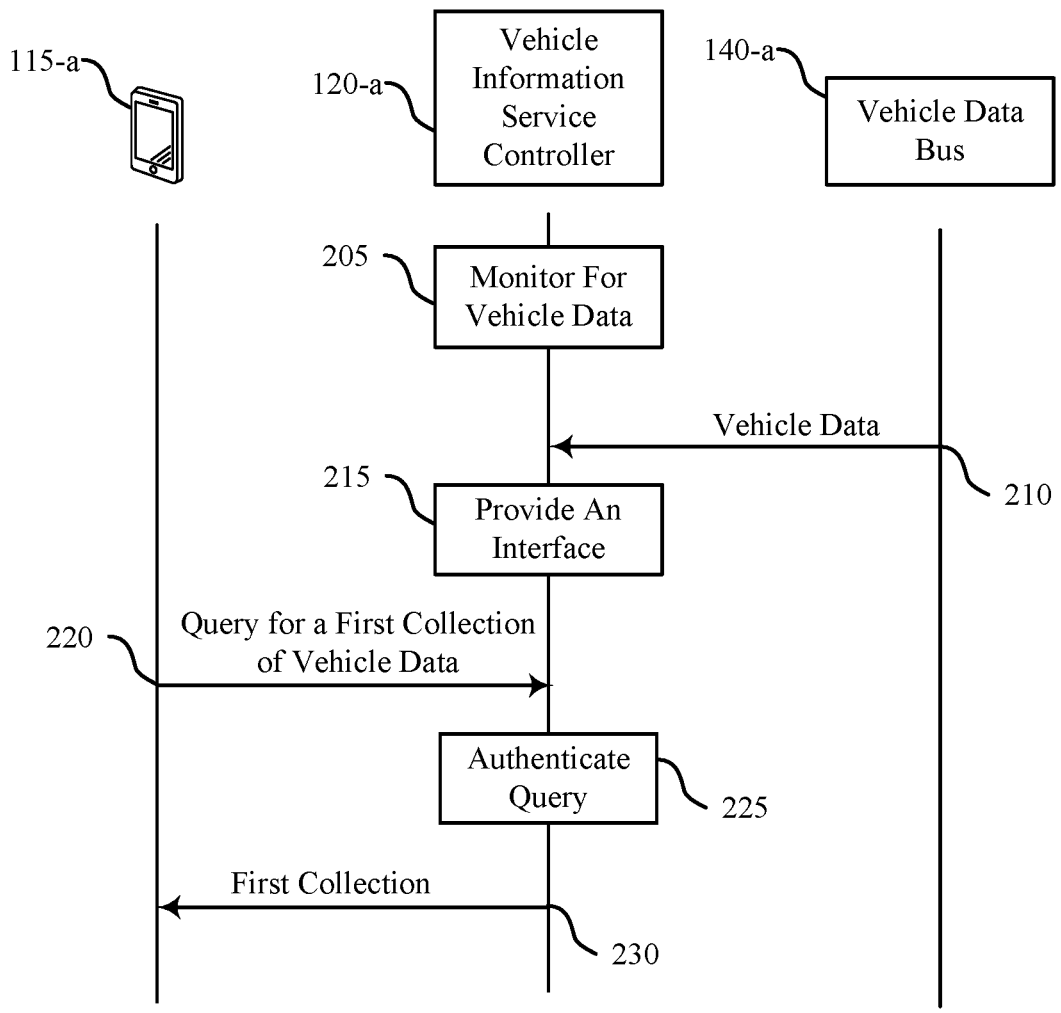
FIGS. 2 through 5 illustrate examples of process flows that support providing a vehicle information service for on-vehicle applications in accordance with aspects of the disclosure.

FIG. 2 illustrates an example of a process flow 200 that supports providing a vehicle information service for on-vehicle applications in accordance with aspects of the disclosure. In some examples, the process flow 200 may be implemented by aspects of the communications environment 100 as described with reference to FIG. 1. The process flow 200 includes communications device 115-*a*, vehicle information service controller 120-*a*, and vehicle data bus 140-*a*, each of which may be examples of the corresponding devices described with reference to FIG. 1. The process flow 200 shows a query operation from the communications device 115-*a* for a first collection of vehicle data. In some cases, the communications device 115-*a*, the vehicle information service controller 120-*a*, and the vehicle data bus 140-*a* may be within a mobile communications environment, for example, a mobile vehicle. The communications device 115-*a* may not have direct access to the vehicle data bus 140-*a*.

At 205, the vehicle information service controller 120-*a* may monitor the vehicle data bus 140-*a* for vehicle data 210. In some cases, the vehicle information service controller 120-*a* may organize the vehicle data 210 into one more collections of vehicle data, where different collections may be authorized for different application authentication profiles and include different combinations of the vehicle data, as described below. In some cases, in monitoring the vehicle data bus 140-*a*, the vehicle information service controller 120-*a* may receive a subset of the one or more collections of the vehicle data substantially continuously. Additionally or alternatively, the vehicle information service controller 120-*a* may receive a subset of the one or more collections of the vehicle data at periodic intervals. For example, one or more sensors coupled with the vehicle data bus 140-*a* may send the vehicle data 210 continuously, or when the vehicle data 210 is updated. Alternatively, one or more other sensors may provide the vehicle data 210 at discrete intervals.

The vehicle data 210 may include, for example, one or more of: a speed or airspeed of the vehicle; a temperature of the air outside the vehicle; a temperature of the air inside the vehicle; an altitude of the vehicle; a destination of the vehicle (e.g., an airport); a distance remaining in a trip; an open/close state of an exit door of the vehicle; an estimated time of arrival to a destination; a total duration of a trip; one or more vehicle identifiers (e.g., a first identifier and a second identifier, where the second identifier may be a "noseID," e.g., on the nose of an airplane); a flight or trip identifier (e.g., unique across different days); a flight or trip number (e.g., a same number may be used in different days); a groundspeed of the vehicle; a heading of the vehicle; a geographic location of the vehicle (e.g., in latitude and longitude); an origin (i.e., a location from which vehicle left, e.g., a departing airport); an state of a public announcement system (e.g., active or not); a time remaining in the trip; an indication of whether there is a load or weight on the vehicle's wheels (i.e., for an aircraft, whether the aircraft has taken off from the ground); flight control computer information; inertial reference system information; radar information; or any combination. Additionally, in some cases, the vehicle data may include any of the aspects of the other types of data as described with reference to FIGS. 1 and 3 through 5. In some cases, the vehicle information service controller 120-*a* may monitor the vehicle data bus 140-*a* for the vehicle data 210 through a vehicle data bus driver.

At 215, the vehicle information service controller 120-*a* may provide an interface for vehicle information services. The interface may, for example, provide access to the one or more collections of the vehicle data received from the vehicle data bus 140-*a*. In some cases, different collections may include different exclusive or non-exclusive sets of the vehicle data 210. In some cases, the interface may be the vehicle information service, as described with reference to FIG. 1.

At 220, the communications device 115-*a* may transmit to the vehicle information service controller 120-*a*, and the vehicle information service controller 120-*a* may receive from the communications device 115-*a*, a query from an application of the communications device 115-*a* for a first collection of the one or more collections of the vehicle data. In some cases, the query may be transmitted using HTTP methods using, for example, specific URIs with an endpoint. The URIs may indicate an interface hostname (i.e., a domain name), port number, interface version, and specific resource that is an endpoint for the query. The queries may contain supporting data (e.g., JSON data) to identify the vehicle data sought.

The query may be transmitted with a cryptographic key (i.e., a security key) to authenticate the query. In some cases, the cryptographic key may be a pre-defined application programming interface key (API key) and transmitted in a header of an HTTP query. In some cases, the cryptographic key may be a unique cryptographic key (e.g., being uniquely associated to a specific application authentication profile). In some cases, the cryptographic key exchange (and the vehicle information service generally) may be configured according to a Transport Layer Security (TLS) protocol. In some cases, a handshake protocol may be used for authentication and key exchange without mutual authentication. However, other TLS implementations as well as other protocols are also contemplated and may be used similarly.

At 225, the vehicle information service controller 120-*a* may authenticate the query for the first collection of vehicle data. The authentication may be based on an application authentication profile associated with the cryptographic key, as may have been received with the query at 220. Different cryptographic keys may be associated with different application authentication profiles. For example, different application authentication profiles may include a customer application profile, a cabin crew application profile, a pilot application profile, and/or a cabin security application profile, among others.

FIG. 8 shows an example application authorization table 800 that supports providing a vehicle information service for on-vehicle applications in accordance with aspects of the disclosure. The application authorization table 800 shows an example correspondence between multiple application profiles 805 to respective collections 810 of vehicle data, where the different collections 810 may be authorized according to application authentication profiles. The application authorization table 800 may be an example of the schemes as described with reference to FIGS. 2 through 5.

As described above, various applications may use collections of the vehicle data to provide the enhanced functionality and integration to vehicle communications. For example, a pilot of an aircraft may use an EFB to perform flight management tasks. An application running on the EFB for use by the pilot may provide a larger collection of vehicle information than, for example, an application running on a communications device to be used by the cabin crew aboard the aircraft. As shown in FIG. 8, the pilot application profile may have access to each of collections 1 through 4, whereas the cabin crew application profile may have access to just collections 1 through 3 but not collection 4.

Similarly, an application running on a device to be used by cabin crew may have access to a larger collection of vehicle information than an application to be used on a passenger's personal communications device or on an IFE system to be used by a passenger. As shown in FIG. 8, the cabin crew application profile may have access to each of collections 1 through 3, whereas the customer application profile may have access to just collection 1.

These differences in the amount of vehicle information available to the applications may be controlled through authorization privileges and profile-based access to the vehicle information for which the profile is authorized. In this way, the vehicle information service controller may provide limited and access-controlled portions of the vehicle information to end-user applications without providing the users access to the vehicle data bus. By providing collections of vehicle information for particular applications based on a per-profile authorization for the particular collection, the vehicle information may limit exposure of potentially sensitive vehicle information to applications that do not use that vehicle information.

Returning to FIG. 2, if the vehicle information service controller 120-*a* successfully authenticates the query for the first collection of vehicle data at 225, the vehicle information service controller 120-*a* may transmit the first collection of vehicle data to the application of the communications device 115-*a* at 230. The vehicle information service controller 120-*a* may respond, for example, via the interface, with a status code (e.g., an HTTP status code) and/or any data (e.g., JSON data) that is responsive to the JSON data specific in the query received at 220. If the vehicle information service controller 120-*a* cannot successfully respond with the identified data, the status codes may indicate, for example, a "bad request" code indicating that the request was malformed or missing required data; "not found" code indicating that the resource request may not be supported, either generally or may be restricted due to insufficient access; and a "method not allowed" code indicating that the request method is not supported.

Figure 3:
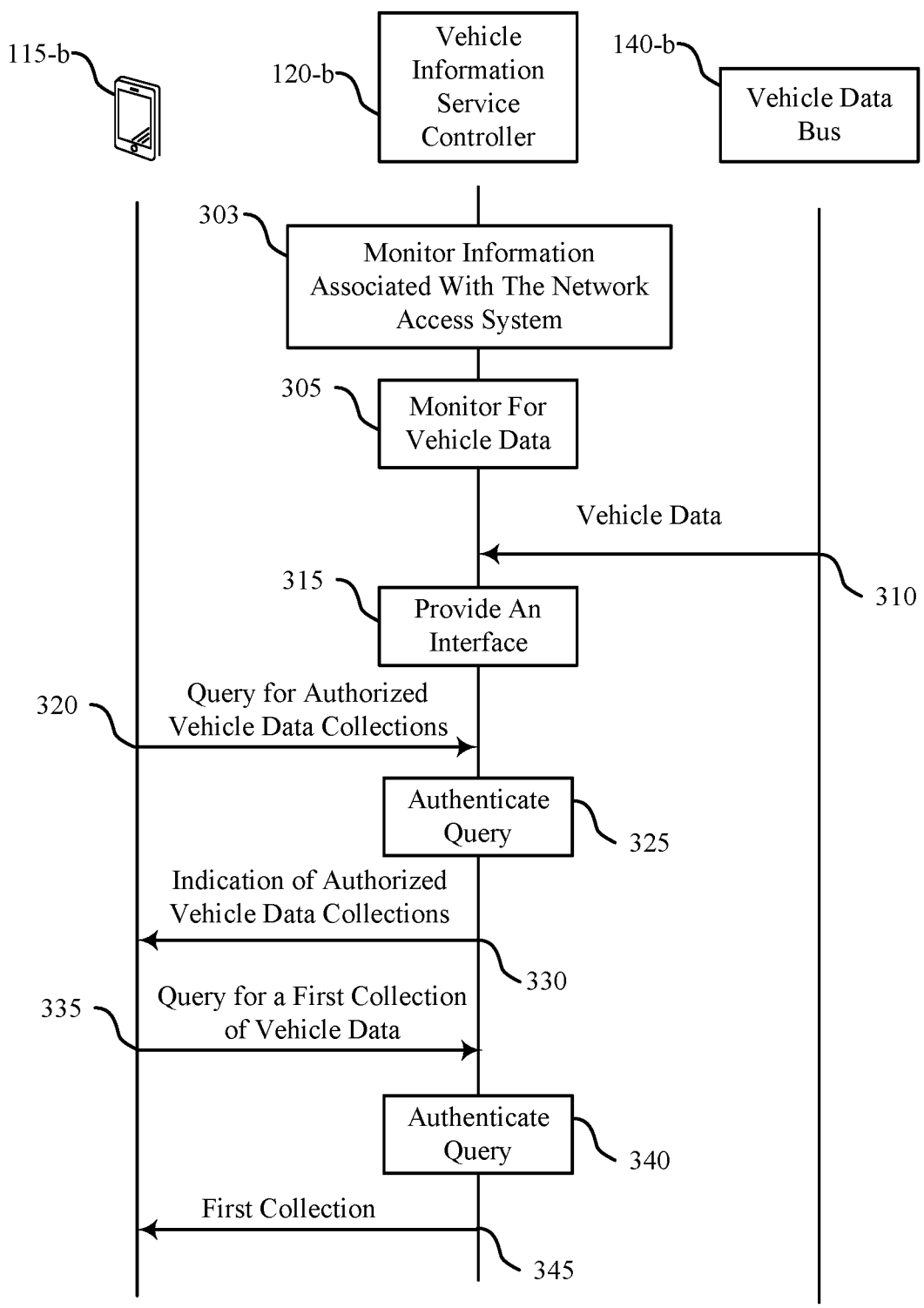

FIG. 3 illustrates an example of a process flow 300 that supports providing a vehicle information service for on-vehicle applications in accordance with aspects of the disclosure. In some examples, the process flow 300 may be implemented by aspects of the communications environment 100 as described with reference to FIG. 1. The process flow 200 includes a communications device 115-*b*, a vehicle information service controller 120-*b*, and a vehicle data bus 140-*b*, each of which may be examples of the corresponding devices described with reference to FIG. 1. The process flow 300 shows a query operation from the communications device 115-*b* for a first collection of vehicle data, as similarly described with reference to FIG. 2. The process flow 300 also shows an additional query operation from the communications device 115-*b* for an indication of the vehicle data collections for which the communications device 115-*b* is authorized. In some cases, the communications device 115-*b*, the vehicle information service controller 120-*b*, and the vehicle data bus 140-*b* may be within a mobile communications environment, for example, a mobile vehicle. The communications device 115-*b* may not have direct access to the vehicle data bus 140-*b*. The vehicle information service controller 120-*b* and the communications device 115-*b* may be connected to a vehicle access network (e.g., the vehicle access network 150 of FIG. 1).

At 303, the vehicle information service controller 120-*b* may monitor information associated with the vehicle access network. For example, the vehicle information service controller 120-*b* may monitor for other services authorized and/or active within the vehicle access network. In monitoring for other services, the vehicle information service controller 120-*b* may identify one or more of: names of possible services on-board the vehicle (e.g., Inflight Connectivity (IFC), BTV or other streaming media content, IFE-ID where the ID may indicate as specific IFE if there are multiple IFEs on the vehicle, wireless IFE (W-IFE), wide area network (WAN), and/or a passenger portal); a reason code for any service that may be down that otherwise could be active; a number of sessions currently in use by the service; a state of the service (e.g., available, down, or disabled); or any combination. Additionally, in some cases, the vehicle access network information may include any of the aspects of the other types of data as described with reference to FIG. 1 or 2.

At 305, the vehicle information service controller 120-*b* may monitor the vehicle data bus 140-*b* for vehicle data 310. In some cases, the vehicle information service controller 120-*b* may organize the vehicle data into one more collections of vehicle data, where different collections may be authorized for different application authentication profiles and include different combinations of the vehicle data. In some cases, in monitoring the vehicle data bus 140-*b*, the vehicle information service controller 120-*b* may receive a subset of the vehicle data 310 substantially continuously. Additionally or alternatively, the vehicle information service controller 120-*b* may receive a subset of the vehicle data 310 at periodic intervals. For example, one or more sensors connected to the vehicle data bus 140-*b* may provide data continuously or upon updated data being available, while one or more other sensors may provide vehicle data updates at discrete intervals.

The vehicle data may include the vehicle data as described with reference to FIG. 2 at 210, as well as any of the aspects of the other types of data as described with reference to FIGS. 1, 2, and 4 through 5. In some cases, the vehicle information service controller 120-*b* may monitor the vehicle data bus 140-*b* for the vehicle data 310 through a vehicle data bus driver.

At 315, the vehicle information service controller 120-*b* may provide an interface for a vehicle information service. The interface may, for example, provide access to one or more collections of the vehicle data 310 received from the vehicle data bus 140-*b*. In some cases, different collections may include different exclusive or non-exclusive sets of the vehicle data. In some cases, the interface may be the vehicle information service, as described with reference to FIG. 1.

At 320, the communications device 115-*b* may transmit to the vehicle information service controller 120-*b*, and the vehicle information service controller 120-*b* may receive from the communications device 115-*b*, a query for an indication of vehicle data collections for which a user authentication profile of the communications device 115-*b* is authorized. For example, a user of the communications device 115-*b* may wish to view a list of the particular vehicle data collections that may be authorized to be used.

The query may be transmitted with a cryptographic key (i.e., a security key) to authenticate the query. In some cases, the cryptographic key may be a pre-defined API key and transmitted in a header of an HTTP query. In some cases, the cryptographic key may be a unique cryptographic key (e.g., being uniquely associated to a specific application authentication profile). In some cases, the cryptographic key exchange (and the vehicle information services generally) may be configured according to a TLS protocol. In some cases, a handshake protocol may be used for authentication and key exchange without mutual authentication. However, other TLS implementations as well as other protocols are also contemplated and may be used similarly.

At 325, may authenticate the query for the indication of vehicle data collections for which the user authentication profile of the communications device 115-*b* is authorized. The authentication may be based on an application authentication profile associated with the cryptographic key, as may have been received with the query at 320. Different cryptographic keys may be associated with different application authentication profiles. For example, different application authentication profiles may include a customer application profile, a cabin crew application profile, a pilot application profile, and/or a cabin security application profile, among other likewise sorts of application profiles.

At 330, if the vehicle information service controller 120-*b* successfully authenticates the query at 325, the vehicle information service controller 120-*b* may transmit to the communications device 115-*b* the indication of vehicle data collections for which the user authentication profile of the communications device 115-*b* is authorized. The indication of vehicle data collections may include a list of the other services offered on the platform, including services that may currently be disabled. The list of the offered services may include the information the vehicle information service controller 120-*b* may have identified at 302. Additionally, in response to the query, the vehicle information service controller 120-*b* may provide additional information about the service if any additional information is available. In particular if IFC is identified as an offered service, the indicated number of sessions currently in use by the service may imply a number of devices that are authorized for WAN service and are currently attached to the wireless LAN. If IFC is identified as an offered service, the vehicle information service controller 120-*b* may further indicate the state of IFC access in a restricted manner (e.g., only the crew devices may access IFC, or IFC is not restricted to the crew, although there may still be other restrictions).

At 335, the communications device 115-*b* may transmit to the vehicle information service controller 120-*b*, and the vehicle information service controller 120-*b* may receive from the communications device 115-*b*, a query from an application of the communications device 115-*b* for a first collection of the one or more collections of the vehicle data. In some cases, the query may be transmitted using HTTP methods using, for example, specific URIs with an endpoint. The URIs may indicate an interface hostname (i.e., a domain name), port number, interface version, and specific resource that is an endpoint for the query. The queries may contain supporting data (e.g., JSON data) to identify the vehicle data sought.

The query may be transmitted with a cryptographic key (i.e., a security key) to authenticate the query. In some cases, the cryptographic key may be a pre-defined API key and transmitted in a header of an HTTP query. In some cases, the cryptographic key may be a unique cryptographic key (e.g., being uniquely associated to a specific application authentication profile). In some cases, the cryptographic key exchange (and the vehicle information service generally) may be configured according to a TLS protocol. In some cases, a handshake protocol may be used for authentication and key exchange without mutual authentication. However, other TLS implementations as well as other protocols are also contemplated and may be used similarly.

At 340, the vehicle information service controller 120-*b* may authenticate the query for the first collection of vehicle data. The authentication may be based on an application authentication profile associated with the cryptographic key, as may have been received with the query at 335. Different cryptographic keys may be associated with different application authentication profiles. For example, different application authentication profiles may include a customer application profile, a cabin crew application profile, a pilot application profile, and/or a cabin security application profile, among other likewise sorts of application profiles.

If the vehicle information service controller 120-*b* successfully authenticates the query for the first collection of vehicle data at 340, the vehicle information service controller 120-*b* may transmit first collection of vehicle data 345 to the application of the communications device 115-*b*. The vehicle information service controller 120-*b* may respond, for example, with a status code (e.g., an HTTP status code) and/or any data (e.g., JSON data) that is responsive to the JSON data identified in the query received at 335. If the vehicle information service controller 120-*a* cannot successfully respond with the identified data, the status codes may indicate, for example, a "bad request" code indicating that the request was malformed or missing required data; "not found" code indicating that the resource request may not be supported, either generally or may be restricted due to insufficient access; and a "method not allowed" code indicating that the request method is not supported.

Figure 4:
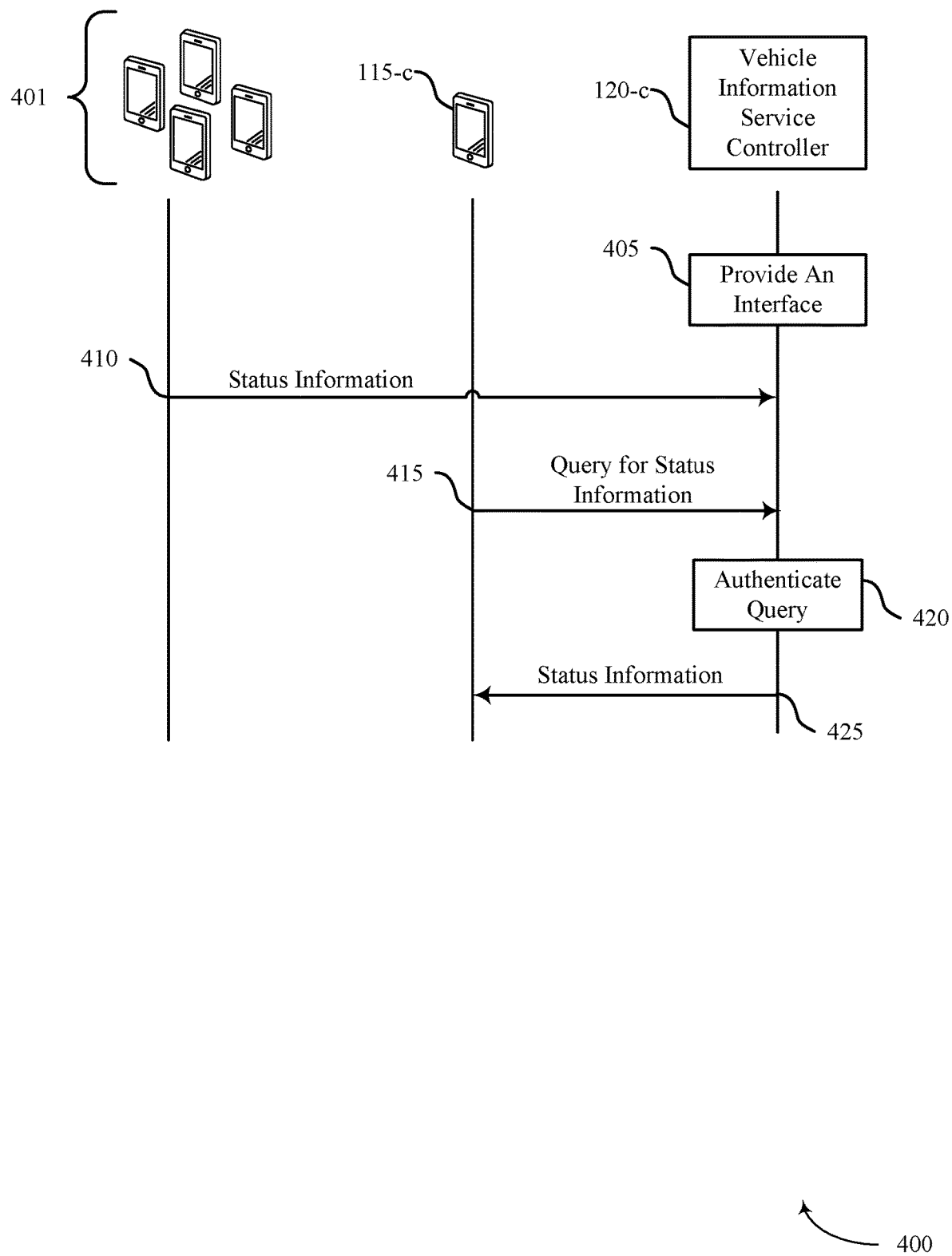

FIG. 4 illustrates an example of a process flow 400 that supports providing a vehicle information service for on-vehicle applications in accordance with aspects of the disclosure. In some examples, the process flow 400 may be implemented by aspects of the communications environment 100. The process flow 400 includes a communications device 115-*c*, a vehicle information service controller 120-*c*, and a communications device set 401, each of which may be examples of the corresponding devices described with reference to FIG. 1. The process flow 400 shows a query operation from the communications device 115-*c* for status information relating to the communications device set 401 on a vehicle. In some cases, the communications device 115-*c*, the vehicle information service controller 120-*c*, and the vehicle data bus 140-*c* may be within a mobile communications environment, for example, a mobile vehicle.

The communications device set 401 may include, as illustrated in FIG. 4, a set of the communications devices 115 within the mobile communications environment. While FIG. 4 illustrates the communications device set 401 as including four communications devices 115, it should be understood that the communications device set 401 may include any number of, and different types of, communications devices distributed in the mobile communications environment. For example, the device set 401 may include customer communications devices 115, an IFE server, a modem, an EFB, a cabin device, or other devices.

At 405, the vehicle information service controller 120-*c* may provide an interface for a vehicle information service. The interface may, for example, provide for status information of the devices on board the vehicle, as well as collections of the vehicle data received from a vehicle data bus, as described with reference to FIGS. 2 and 3. In some cases, the interface may be the vehicle information service, as described with reference to FIG. 1.

At 410, each of the communications devices 115 making up the communications device set 401 may transmit to the vehicle information service controller 120-*c*, and the vehicle information service controller 120-*c* may receive from the respective communications devices 115 of the communications device set 401, status information pertaining to each of the respective communications devices 115 of the communications device set 401. This may allow for an application to integrate the device set 401 with monitoring of the overall mobile environment. The status information may include, for example, one or more of: an identification of each of the transmitting devices (e.g., a name such as "Modem," or "IfeServer"); a state of each of the transmitting devices (e.g., whether the device is available, down, or disabled); a fan speed of each of the transmitting devices (e.g., either normal or low for an on-board cabinet fan, if the vehicle is so equipped); or any combination. Additionally, in some cases, the status information may also include any of the aspects of the other types of data as described with reference to FIGS. 1 through 3 and 5.

At 415, the communications device 115-*c* may transmit to the vehicle information service controller 120-*c*, and the vehicle information service controller 120-*c* may receive from the communications device 115-*c*, a query for the status information pertaining to each of the respective communications devices 115 of the communications device set 401.

The query may be transmitted with a cryptographic key (i.e., a security key) to authenticate the query. In some cases, the cryptographic key may be a pre-defined API key and transmitted in a header of an HTTP query. In some cases, the cryptographic key may be a unique cryptographic key (e.g., being uniquely associated to a specific application authentication profile). In some cases, the cryptographic key exchange (and the vehicle information service generally) may be configured according to a TLS protocol. In some cases, a handshake protocol may be used for authentication and key exchange without mutual authentication. However, other TLS implementations as well as other protocols are also contemplated and may be used similarly.

At 420, the vehicle information service controller 120-*c* may authenticate the query for the status information pertaining to each of the respective communications devices 115 of the communications device set 401. The authentication may be based on an application authentication profile associated with the cryptographic key, as may have been received with the query at 415. Different cryptographic keys may be associated with different application authentication profiles. For example, different application authentication profiles may include a customer application profile, a cabin crew application profile, a pilot application profile, and/or a security application profile, among other likewise sorts of application profiles.

If the vehicle information service controller 120-*c* successfully authenticates the query for the first collection of vehicle data at 420, the vehicle information service controller 120-*c* may transmit to the communications device 115-*c* the status information 425 pertaining to each of the respective communications devices 115 of the communications device set 401. The status information may, for example, be presented as a list of devices deployed on the vehicle with their corresponding status information.

Figure 5:
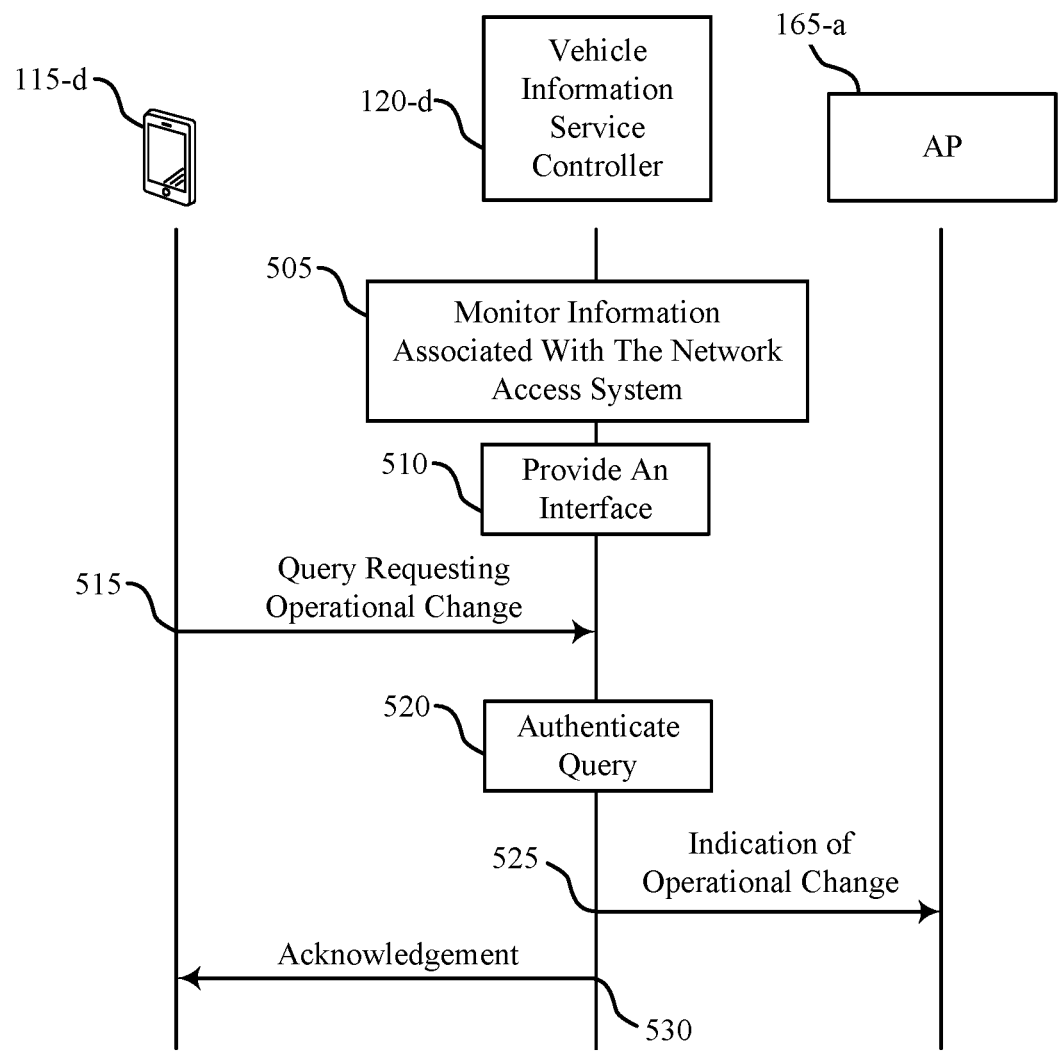

FIG. 5 illustrates an example of a process flow 500 that supports providing a vehicle information service for on-vehicle applications in accordance with aspects of the disclosure. In some examples, the process flow 500 may be implemented by aspects of the communications environment 100. The process flow 500 includes a communications device 115-*d*, a vehicle information service controller 120-*d*, and an AP 165-*a*, each of which may be examples of the corresponding devices described with reference to FIG. 1. The vehicle information service controller 120-*d* and the AP 165-*a* may make up, or partly make up, a vehicle access network, as described with reference to FIG. 1. The process flow 500 shows a query operation from the communications device 115-*d* for requesting an operational change for a component of the vehicle access network and providing control of the component to the communications device 115-*d*.

In some cases, the communications device 115-*d*, the vehicle information service controller 120-*d*, and the vehicle data bus 140-*d* may be within a mobile communications environment, for example, a mobile vehicle. The vehicle access network may be connected via a communication link to a network gateway, where the vehicle access network provides a communications service to one or more devices on the mobile communications environment (e.g., to one or more communications devices 115-*d* aboard a mobile vehicle).

At 505, the vehicle information service controller 120-*d* may monitor information associated with the vehicle access network (e.g., of one or more components of the vehicle access network). For example, the vehicle information service controller 120-*d* may monitor a state of one or more APs 165 within the vehicle access network. By monitoring the state of the one or more APs 165, the vehicle information service controller 120-*d* may identify for each AP 165, one or more of: a AP description (including, e.g., brand, model, and OS version); one or more frequencies at which the AP is operating; a transmission power allocated to the one or more frequencies at which the AP is operating; a number of users on the AP; a name of the AP; a state of the AP (e.g., that the AP is up and reporting, or that the AP is not reachable); or any combination. Additionally, in some cases, the vehicle data may include any of the aspects of the other types of data as described with reference to FIGS. 1 through 4.

At 510, the vehicle information service controller 120-*d* may provide an interface for a vehicle information service. The interface may, for example, provide one or more collections of the vehicle data received from a vehicle data bus, as described with reference to FIGS. 2 and 3. In some cases, the interface may be the vehicle information service, as described with reference to FIG. 1.

At 515, an application of the communications device 115-*d* may transmit to the vehicle information service controller 120-*d*, and the vehicle information service controller 120-*d* may receive from the application of the communications device 115-*d*, a query requesting an operational change for one or more components of the vehicle access network. For example, the communications device 115-*d* may transmit a query to the vehicle information service controller 120-*d* requesting that a AP 165 of the vehicle access network be restarted.

The query may be transmitted with a cryptographic key (i.e., a security key) to authenticate the query. In some cases, the cryptographic key may be a pre-defined API key and transmitted in a header of an HTTP query. In some cases, the cryptographic key may be a unique cryptographic key (e.g., being uniquely associated to a specific application authentication profile). In some cases, the cryptographic key exchange (and the vehicle information service generally) may be configured according to a TLS protocol. In some cases, a handshake protocol may be used for authentication and key exchange without mutual authentication. However, other TLS implementations as well as other protocols are also contemplated and may be used similarly.

At 520, the vehicle information service controller 120-*d* may authenticate the query requesting the operational change for one or more components of the vehicle access network. In some cases, the authentication may be based on an application authentication profile associated with the cryptographic key, as may have been received with the query at 515. Different cryptographic keys may be associated with different application authentication profiles. For example, different application authentication profiles may include a customer application profile, a cabin crew application profile, a pilot application profile, and/or a security application profile, among other likewise sorts of application profiles.

At 525, if the vehicle information service controller 120-*d* successfully authenticates the query for the operational change at 520, the vehicle information service controller 120-*d* may indicate to the AP 165-*a* the requested operational change for the AP 165-*a*. For example, the vehicle information service controller 120-*d* may indicate to the AP 165-*a* that the AP 165-*a* is to be restarted. The AP 165-*a* may then cycle its power to restart. Once indicating for the AP 165-*a* to restart, the vehicle information service controller 120-*d* may subsequently initiate polling to obtain further AP status information to determine, for example, when the AP 165-*a* is back online.

At 530, if the vehicle information service controller 120-*d* successfully authenticates the query for the operational change at 520, the vehicle information service controller 120-*d* may transmit to the application of the communications device 115-*d* an acknowledgment. The acknowledgment may indicate to the application of the communications device 115-*d* that the vehicle information service controller 120-*d* was able to successfully provide user control of the one or more components of the vehicle access network to the application of the communications device 115-*d* (e.g., that the AP of the vehicle access network has successfully been restarted based on successfully authenticating the user authentication profile).

In some cases, the mobile communications environment may include one or more cabin service devices, such as a coffee maker, a refrigerator, a fan or vent, an air conditioner, a lighting fixture, a restroom indicator, and the like. As similarly described above for an operational change of a component of the vehicle access network, an application of the communications device 115-*d* may transmit to the vehicle information service controller 120-*d* a query requesting an operational change of a cabin service device (i.e., to control the cabinet service device), the query transmitted with a cryptographic key for an associated user authentication profile, as similarly described above for the query transmitted at 515. The vehicle information service controller 120-*d* may authenticate the query using the cryptographic key. If the authentication is successful, the vehicle information service controller 120-*d* may route to the respective cabin service device an instruction to carry out the operational change and transmit to the application of the communications device 115-*d* an acknowledgment indicating that the operational change was successful.

In some cases, instead of, or in addition to, transmitting the query requesting the operational change, the communications device 115-*d* may transmit to the vehicle information service controller 120-*d* a query requesting the AP status information, as identified at 505. In this case, the vehicle information service controller 120-*d* may similarly authenticate the query requesting the AP status information. If the vehicle information service controller 120-*d* successfully authenticates the query requesting the AP status information, the vehicle information service controller 120-*d* may transmit to the communications device 115-*d* the AP status information as may have been identified at 505.

Figure 6:
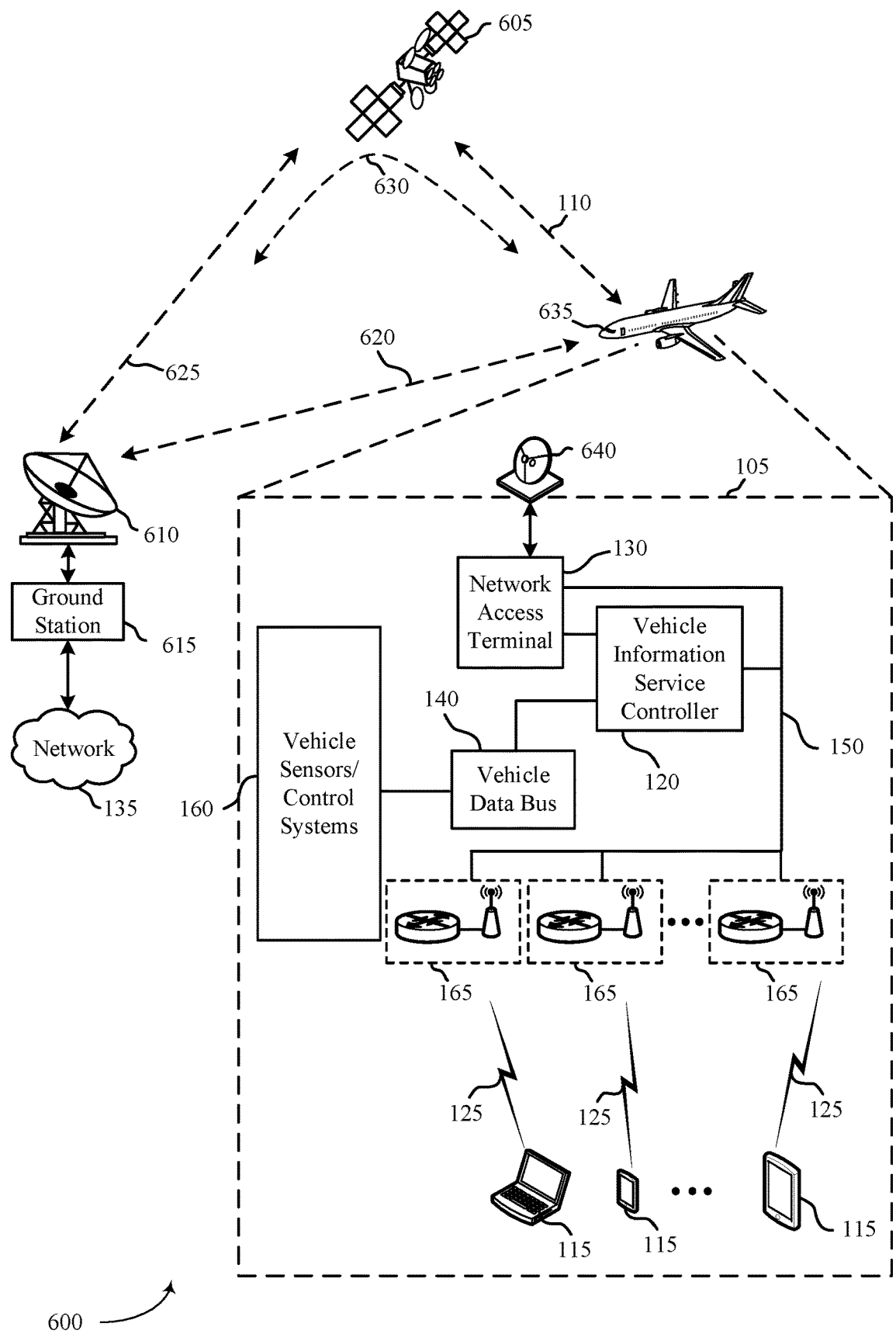
FIG. 6 shows a simplified diagram of an example wireless communications system that supports providing a vehicle information service for on-vehicle applications in accordance with aspects of the disclosure.

FIG. 6 shows a simplified diagram of an example wireless communications system 600 that supports providing vehicle information services for on-vehicle applications in accordance with aspects of the disclosure. The wireless communications system 600 may include a satellite 605 (or multiple satellites 605), a ground station 615, a ground station antenna system 610, and a mobile communications environment 105 including a vehicle access network 150. The wireless communications system 600 may be an example of a communications system to include the communications environment as described with reference to FIG. 1. The devices of the wireless communications system 600 may be examples of the corresponding devices described with reference to FIG. 1.

In operation, the wireless communications system 600 provides network services via the vehicle access network 150 to multiple communications devices 115 on a mobile vehicle 635. For example, the wireless communications system 600 may provide for two-way communications between the vehicle access network 150 and an external network 135 via the satellite 605 and the ground station 615. The external network 135 may be, for example, one or more private or public networks (e.g., Intranets, the Internet, telephony networks). In some cases, the network access terminal 130 and the vehicle information service controller 120 are considered to be part of the vehicle access network 150. The network access terminal 130 may include an antenna 640, which may be located in a location on the mobile vehicle suitable for maintaining communications with a satellite 605 or ground station (e.g., on the fuselage of an aircraft).

The satellite or satellites 605 may include any suitable type of communications satellite. In some examples, some or all of the satellites may be in geostationary orbits. In other examples, any appropriate orbit (e.g., medium earth orbit (MEO), low earth orbit (LEO), etc.) for satellite 605 may be used.

The ground station 615 may send and receive signals to and from the satellite 605 via communication link 625 using the ground station antenna system 610. The ground station antenna system 610 may be two-way capable and designed with adequate transmit power and receive sensitivity to communicate reliably with the satellite 605.

The vehicle information service controller 120 may use the antenna 640 to communicate signals with the satellite 605 via a communication link 110. The antenna 640 may be mounted to an elevation and azimuth gimbal which points the antenna 640 (e.g., actively tracking) at satellite 605. The wireless communications system 600 may operate in the International Telecommunications Union (ITU) Ku, K, or Ka-bands, for example from 17.7 to 21.2 Giga-Hertz (GHz). Alternatively, the wireless communications system 600 may operate in other frequency bands such as C-band, X-band, S-band, L-band, and the like. As illustrated in FIG. 6, the antenna 640 is mounted on a mobile vehicle 635 and the devices of the mobile communications environment 105 are distributed in the mobile vehicle 635.

The network access terminal 130 may be configurable (e.g., remotely configurable) to provide one or more communications devices 115 on the mobile vehicle 635 with access to various network services via the vehicle information service controller 120. For example, the network access terminal 130 may be configured to permit one or more of the communications devices 115 to access one or more uniform resource locators (URLs) or IP addresses, and/or to communicate with ground-based servers associated with a network services provider, an external services provider, or other networks (e.g., the Internet). The network access terminal 130 may also perform other traffic management functions (e.g., network address assignment or translation, traffic shaping, etc.).

The vehicle information service controller 120 may connect to the different devices and components of the communications environment 100 via the vehicle access network 150. For example, the vehicle information service controller 120 may be accessible as a server on the vehicle access network 150. In some examples, the vehicle information service controller 120 may be integrated with other components of the mobile environment 105 such as the network access terminal 130, or be integrated with one of the APs 165.

The vehicle 635 may include a vehicle data bus 140. The vehicle data bus 140 may be, for example, an avionics data bus such as an ARINC bus, a CAN bus, and the like. The vehicle data bus 140 may be used to connect and/or control by multiple vehicle sensors/control systems 160, communication systems, and/or control systems distributed in the mobile communications environment 105. The vehicle sensors/control systems 160 may include, for example, a GNSS receiver, inertial measurement sensors, gyroscopes, temperature sensors, altimeters, speedometers, and various other measurement devices as described herein (e.g., measurement devices corresponding to each of the parameters as discussed with reference to FIGS. 1 through 5). The vehicle data bus may be independent of the vehicle access network 150 (e.g., not addressable or directly accessible from the vehicle access network 150). That is, the communications devices 115 may not have direct access to the vehicle data bus 140.

The vehicle information service controller 120 may be coupled with the vehicle data bus 140 and may monitor vehicle information (e.g., various measurements from the sensors 160). In some cases, the vehicle information service controller 120 may monitor the vehicle data bus 140 using a vehicle data bus driver.

According to various aspects, the network access terminal 130 may include various electronic components, such as a processor and memory, to enable the network access terminal 130 to be configured to provide access to network services based on configuration information received in control signaling received from, for example, a network operation center (NOC) (not shown) associated with a network services provider. The NOC may, for example, include facilities or equipment associated with a network services provider. The NOC may configure the network access terminal 130 to provide various network services to devices communications 115 on mobile vehicle 635.

In some cases, the wireless communications system 600 may provide for two-way communications between the vehicle access network 150 and the external network 135 via the satellite 605 (e.g., via the communication link 630. Alternatively, the wireless communications system 600 may provide for two-way communications between the vehicle access network 150 and the external network 135 and/or the ground station 615 via an air-to-ground communication link 620.

In some cases, the mobile vehicle 635 may be associated with or identified by vehicle information parameters including, for example, a vehicle identifier (e.g., a tail number or vessel ID), a fleet identifier, a trip number (e.g., a flight number), a route identifier, a trip duration, a origination terminal identifier, a destination terminal identifier, a scheduled or actual departure time or date, and/a or scheduled or actual arrival time or date.

Although FIG. 6 depicts a mobile vehicle 635 that is an aircraft, similar or analogous communications systems and techniques for providing vehicle information services for on-vehicle applications may be used for terrestrial mobile vehicles, such as trains, buses, boats, automobiles, and the like. For example, the wireless communications system 600 may provide for two-way communications between the vehicle access network 150 and the external network 135 or ground station 615 via the satellite communication link 630, or via a ground-to-ground (e.g., for terrestrial mobile vehicles) without the use of the satellite 605.

Figure 7:
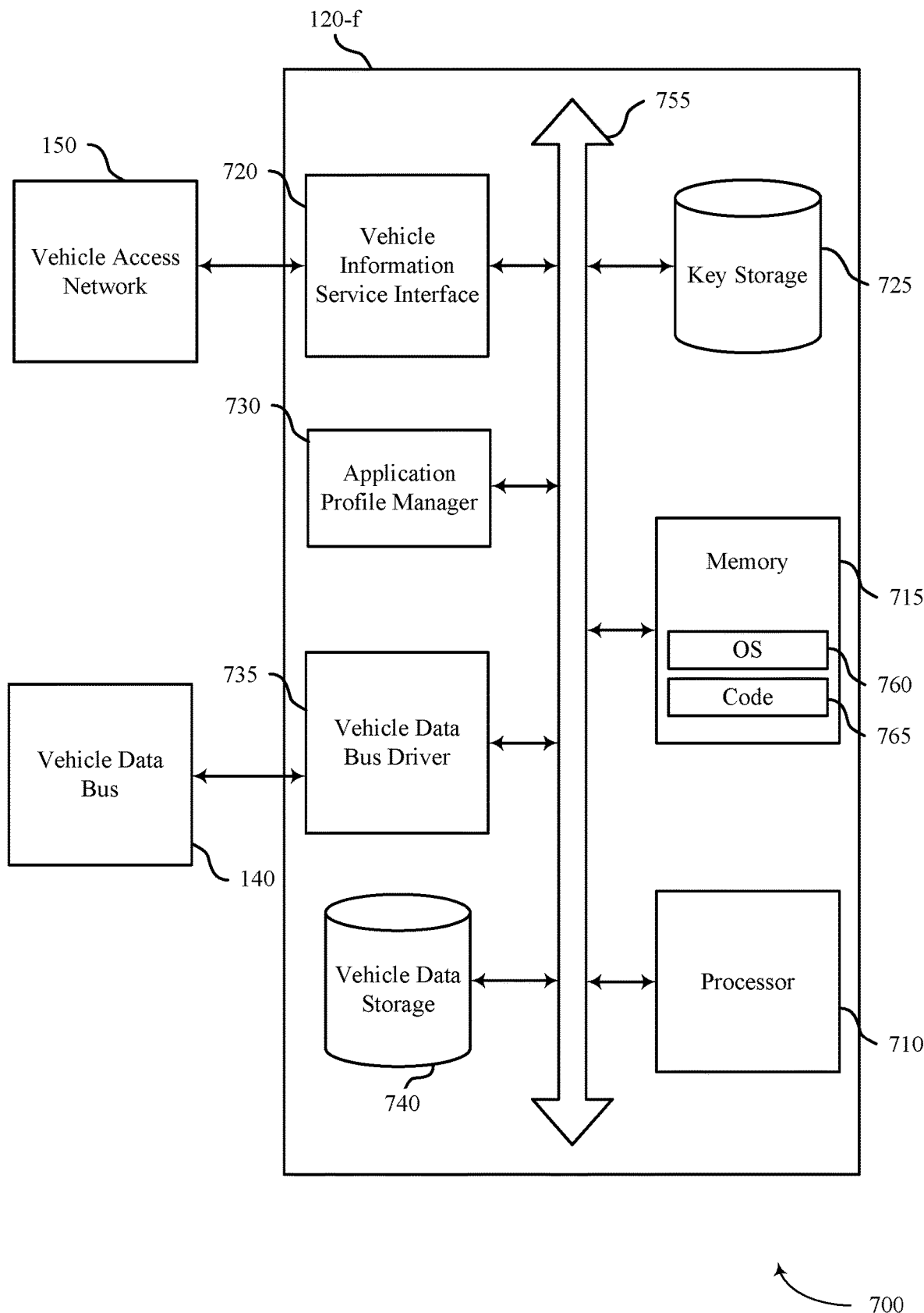
FIG. 7 shows a block diagram of a vehicle information service system that supports providing a vehicle information service for on-vehicle applications in accordance with aspects of the disclosure.

FIG. 7 shows a block diagram of a vehicle information service system 700 that supports providing a vehicle information service for on-vehicle applications in accordance with aspects of the disclosure. The vehicle information service system 700 may be a part of and include one or more of the devices of the mobile communications environments 105 as described with reference to FIGS. 1 and 6. The vehicle information service system 700 may include vehicle information service controller 120-f. Vehicle information service controller 120-f may include a processor 710, memory 715, a vehicle information service interface 720, a key storage 725, an application profile manager 730, a vehicle data bus driver 735, and a vehicle data storage 740. Each of these components may be in communication with each other, directly or indirectly, over one or more buses 755.

The memory 715 may include random access memory (RAM) and/or read-only memory (ROM). The memory 715 may store an operating system (OS) 760 (e.g., built on a Linux or Windows kernel). The memory 715 may also store computer-readable, computer-executable code 765 including instructions that are configured to, when executed, cause the processor 710 to perform various functions described herein related to providing vehicle information services for on-vehicle applications. Alternatively, the code 765 may not be directly executable by the processor 710 but may be configured to cause the vehicle information service controller 120-f (e.g., when compiled and executed) to perform one or more of the functions described herein.

The vehicle information service interface 720 may provide connections among the different devices and components of vehicle information service controller 120-f. The vehicle information service interface 720 may receive, determine, and route commands between the devices of the vehicle information service controller 120-f to control communications between each of the components. In some cases, the vehicle information service interface 720 may provide an interface (e.g., a vehicle information service) for a vehicle information services that provides a plurality of collections of vehicle data.

The vehicle information service interface 720 may be coupled with a vehicle access network 150 that may be, for example, the vehicle access network 150 of FIG. 1 or 6. In some case, the vehicle information service interface 720 may be coupled with the vehicle access network 150 via a wired or wireless connection.

The vehicle information service controller 120-f may include a vehicle data bus driver 735. The vehicle data bus driver 735 may be coupled with a vehicle data bus 140. The vehicle data bus 140 may interface with one or more sensors or control systems as described with reference to FIGS. 1-6. The vehicle data bus driver 735 may monitor the vehicle data bus 140 for vehicle data. The vehicle data bus driver 735 may be configured, for example, via particular software designed for the vehicle data bus 140, to receive the vehicle data from the vehicle data bus 140. In some cases, the vehicle data bus driver 735 may provide (e.g., continuously or periodically) aggregated vehicle data to the vehicle data storage 740. Alternatively, the vehicle data bus driver 735 may provide the aggregated vehicle data directly to, for example, the vehicle information service interface 720 for routing to another component of the vehicle information services controller 120-f. The vehicle data bus driver 735 may also, in some cases, provide a software interface to provide commands to components of a vehicle via the vehicle data bus 140 (e.g., control commands to control cabin devices or equipment coupled with the vehicle data bus).

The vehicle data storage 740 may store the vehicle data obtained by the vehicle data bus driver 735. The stored vehicle data may be organized into one more collections of vehicle data, where different collections may be authorized for different application authentication profiles. Different collections of vehicle data may include different combinations of, for example, vehicle location information, vehicle attitude information, vehicle altitude information, vehicle identification information, vehicle trip information, flight control computer information, inertial reference system information, radar information, or a combination thereof, as well as any of the other various types of vehicle data as described herein.

The vehicle information service interface 720 may receive, via the vehicle access network 150, a query from an application of a communications device for a first collection of a plurality of collections of vehicle data. In some cases, the query may include a cryptographic key, which may be compared to a cryptographic key stored at the key storage 725 by the application profile manager 730. After retrieving the cryptographic key from the key storage 725, the application profile manager 730 may authenticate the query for the first collection based on an application authentication profile associated with the cryptographic key. If the key successfully authenticates the query, the vehicle information service interface 720 may transmit the first collection to the application of the device based on successfully authenticating the query for the first collection.

The key storage 725 may store cryptographic keys (i.e., security keys) received by the vehicle information service controller 102-*f* that may be used to authenticate queries for collections of vehicle data, queries for authorized vehicle information services, queries requesting operational changes, etc. In some cases, these cryptographic keys may be pre-defined API keys received in headers of HTTP queries.

Figure 9:
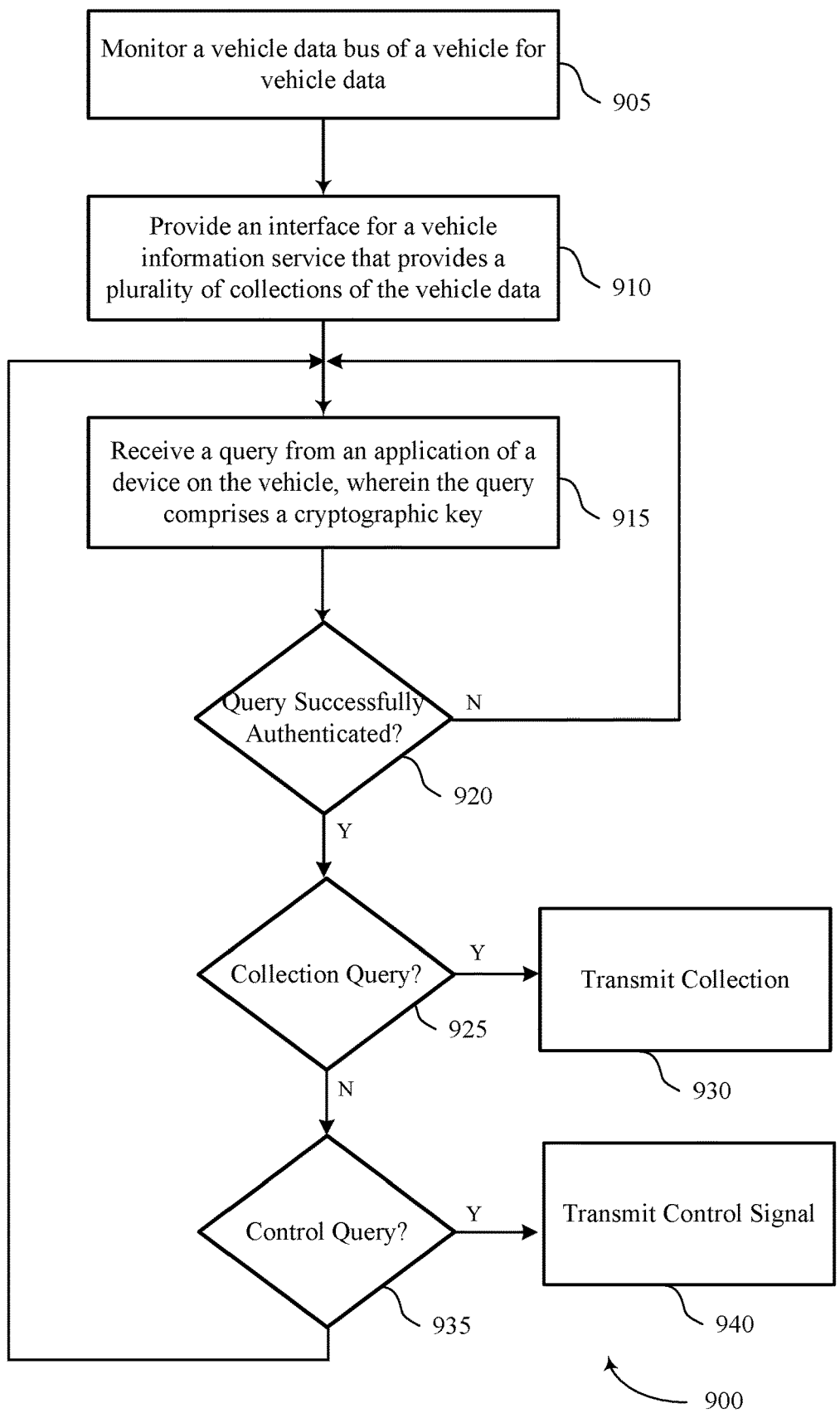
FIG. 9 shows a flowchart illustrating a method that supports providing a vehicle information service for on-vehicle applications in accordance with aspects of the disclosure.

FIG. 9 shows a flowchart illustrating a method 900 that supports providing vehicle information services for on-vehicle applications in accordance with aspects of the disclosure. The method 900 may be performed at a vehicle information service controller, as described with reference to FIGS. 1 through 7. The information service controller may be coupled with a vehicle access network and a vehicle data bus. Communications devices may be coupled with the vehicle access network for network access service and/or other on-board content or functions.

At 905, the vehicle information service controller may monitor a vehicle data bus of a vehicle for vehicle data. The operations of block 905 may be performed according to the methods described herein. In some examples, aspects of the operations of block 905 may be performed by a vehicle data bus driver 735 or vehicle data storage 740 as described with reference to FIG. 7.

At 910, the vehicle information service controller may provide an interface for a vehicle information service that provides a plurality of collections of the vehicle data. The operations of block 910 may be performed according to the methods described herein. In some examples, aspects of the operations of block 905 may be performed by a vehicle information service interface as described with reference to FIG. 7.

At 915, the vehicle information service controller may receive a query from an application of a device on the vehicle, where the query includes a cryptographic key. The query may be a collection query for a first collection of the plurality of collections of the vehicle data. Alternatively, the query may be a control query to send a control command to a device via the vehicle access network or the vehicle data bus. The operations of block 915 may be performed according to the methods described herein. In some examples, aspects of the operations of block 915 may be performed by a vehicle information service interface 720 as described with reference to FIG. 7.

At 920, the vehicle access network may authenticate the query based on an application authentication profile associated with the cryptographic key. If the query is successfully authenticated, the query may be processed at blocks 925, 935. If, however, the query is not authenticated (the cryptographic key is invalid, or the associated application authentication profile is not authorized to receive the requested collection or perform the requested commend), the vehicle information service controller may respond to indicate the query was not authenticated, or may ignore the query. The vehicle information service controller may await additional queries at block 915. The operations of block 920 may be performed according to the methods described herein. In some examples, aspects of the operations of 1305 may be performed by an application profile manager 730 as described with reference to FIG. 7.

At 925, the vehicle information service controller may process queries for data collections. For example, if the query is associated with a first collection and was authenticated for access to the first collection at block 920, then the vehicle information service controller may transmit the first collection to the application of the device at 930. The operations of blocks 925 and 930 may be performed according to the methods described herein. In some examples, aspects of the operations of blocks 925 and 930 may be performed by a vehicle information service interface 720 as described with reference to FIG. 7.

At 935, the vehicle information service controller may process queries for control commands. For example, if the query is associated with control command to control a device accessible via the vehicle access network (e.g., AP), or the vehicle data bus (e.g., cabin indicator lighting) and authenticated for access to the device at block 920, then the vehicle information service controller may transmit the control command to the device at 940. The operations of blocks 935 and 940 may be performed according to the methods described herein. In some examples, aspects of the operations of blocks 935 and 940 may be performed by a vehicle information service interface 720 as described with reference to FIG. 7.

The various illustrative blocks and components described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration The detailed description set forth above in connection with the appended drawings describes exemplary embodiments and does not represent the only embodiments that may be implemented or that are within the scope of the claims. The term "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functions described herein may be implemented in various ways, with different materials, features, shapes, sizes, or the like. Other examples and implementations are within the scope of the disclosure and appended claims. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the widest scope consistent with the principles and novel features disclosed herein.

What is claimed is:

1. A method, comprising:
monitoring a vehicle data bus of a vehicle for vehicle data;
providing an interface for a vehicle information service that provides a plurality of collections of the vehicle data;
receiving a first query from an application of a first device on the vehicle for a first collection of the plurality of collections of the vehicle data, wherein the first query comprises a first cryptographic key;
authenticating the first query for the first collection based at least in part on a first application authentication profile associated with the first cryptographic key; and
transmitting the first collection to the application of the first device based at least in part on successfully authenticating the first query for the first collection.

2. The method of claim 1, further comprising transmitting, to the first device, an indication of authorized vehicle information services based at least in part on the first application authentication profile.

3. The method of claim 1, wherein the vehicle comprises a network access system connected, via a communication link, to a network gateway, the network access system providing a communications service to a plurality of devices on the vehicle.

4. The method of claim 3, further comprising monitoring information associated with the network access system.

5. The method of claim 3, further comprising:
receiving a second query requesting an operational change for a component of the network access system; and
providing user control of one or more components of the network access system to the application based at least in part on the first application authentication profile.

6. The method of claim 1, wherein the vehicle comprises a cabin service device, the method further comprising:
providing user control of the cabin service device to the first device based at least in part on the first application authentication profile of the first device.

7. The method of claim 1, further comprising:
receiving status information from a plurality of devices on the vehicle;
receiving a second query from the first device for the status information, the status information associated with a second cryptographic key;
authenticating the second query for the status information based at least in part on a second application authentication profile associated with the second cryptographic key; and
transmitting the status information to the first device based at least in part on successfully authenticating the second query for the status information.

8. The method of claim 1, wherein the monitoring the vehicle data bus comprises receiving a subset of the plurality of collections of the vehicle data substantially continuously.

9. The method of claim 1, wherein the monitoring the vehicle data bus comprises receiving a subset of the plurality of collections of the vehicle data at periodic intervals.

10. The method of claim 1, wherein the first application authentication profile is associated with a unique cryptographic key.

11. The method of claim 1, wherein the plurality of collections of the vehicle data comprises different combinations of vehicle location information, vehicle attitude information, vehicle altitude information, vehicle identification information, vehicle trip information, flight control computer information, inertial reference system information, radar information, or a combination thereof.

12. The method of claim 1, wherein a plurality of cryptographic keys are associated with a plurality of application authentication profiles, the plurality of application authentication profiles comprising a customer application profile, a cabin crew application profile, a pilot application profile, or a combination thereof.

13. The method of claim 1, wherein the first device does not have direct access to the vehicle data bus.

14. The method of claim 1, further comprising:
receiving a second query from an application of a second device on the vehicle, wherein the second query comprises a second cryptographic key;
authenticating the second query for the first collection and a second collection of the plurality of collections of the vehicle data based at least in part on a second application authentication profile associated with the second cryptographic key; and
transmitting the first collection and the second collection to the application of the second device based at least in part on successfully authenticating the second query for the second application authentication profile.

15. The method of claim 14, wherein the first collection and the second collection each include a first item of the vehicle data and a second item of the vehicle data is in the first collection and not in the second collection.

16. An apparatus, comprising:
a processor,
memory in electronic communication with the processor; and
instructions stored in the memory and executable by the processor to cause the apparatus to:
monitor a vehicle data bus of a vehicle for vehicle data;
provide an interface for a vehicle information service that provides a plurality of collections of the vehicle data;
receive a first query from an application of a first device on the vehicle for a first collection of the plurality of collections of the vehicle data, wherein the first query comprises a first cryptographic key;
authenticate the first query for the first collection based at least in part on a first application authentication profile associated with the first cryptographic key; and
transmit the first collection to the application of the first device based at least in part on successfully authenticating the first query for the first collection.

17. The apparatus of claim 16, further comprising transmitting, to the first device, an indication of authorized vehicle information services based at least in part on the first application authentication profile of the first device.

18. The apparatus of claim 16, wherein the vehicle comprises a network access system connected, via a communication link, to a network gateway, the network access system providing a communications service to a plurality of devices on the vehicle.

19. The apparatus of claim 18, further comprising monitoring information associated with the network access system.

20. The apparatus of claim 18, wherein the instructions are further executable by the processor to cause the apparatus to:
receive a second query requesting an operational change for a component of the network access system; and
provide user control of one or more components of the network access system to the application based at least in part on the first application authentication profile.

21. The apparatus of claim 16, wherein the vehicle comprises a cabin service device, and the instructions are further executable by the processor to cause the apparatus to:
provide user control of the cabin service device to the first device based at least in part on the first application authentication profile.

22. The apparatus of claim 16, wherein the instructions are further executable by the processor to cause the apparatus to:
receive status information from a plurality of devices on the vehicle;
receive a second query from the first device for the status information, the status information associated with a second cryptographic key;
authenticate the second query for the status information based at least in part on a second application authentication profile associated with the second cryptographic key; and
transmit the status information to the first device based at least in part on successfully authenticating the second query for the status information.

23. The apparatus of claim 16, wherein the monitoring the vehicle data bus comprises receiving a subset of the plurality of collections of the vehicle data substantially continuously.

24. The apparatus of claim 16, wherein the monitoring the vehicle data bus comprises receiving a subset of the plurality of collections of the vehicle data at periodic intervals.

25. The apparatus of claim 16, wherein the first application authentication profile is associated with a unique cryptographic key.

26. The apparatus of claim 16, wherein the plurality of collections of the vehicle data comprises different combinations of vehicle location information, vehicle attitude information, vehicle altitude information, vehicle identification information, vehicle trip information, flight control computer information, inertial reference system information, radar information, or a combination thereof.

27. The apparatus of claim 16, wherein a plurality of cryptographic keys are associated with a plurality of application authentication profiles, the plurality of application authentication profiles comprising a customer application profile, a cabin crew application profile, a pilot application profile, or a combination thereof.

28. The apparatus of claim 16, wherein the first device does not have direct access to the vehicle data bus.

29. The apparatus of claim 16, wherein the instructions are further executable by the processor to cause the apparatus to:
receive a second query from an application of a second device on the vehicle, wherein the second query comprises a second cryptographic key;
authenticate the second query for the first collection and a second collection of the plurality of collections of the vehicle data based at least in part on a second application authentication profile associated with the second cryptographic key; and
transmit the first collection and the second collection to the application of the second device based at least in part on successfully authenticating the second query for the second application authentication profile.

30. The apparatus of claim 29, wherein the first collection and the second collection each include a first item of the vehicle data and a second item of the vehicle data is in the first collection and not in the second collection.

* * * * *